(12) United States Patent
Katz et al.

(10) Patent No.: US 11,556,758 B2
(45) Date of Patent: Jan. 17, 2023

(54) LEARNING APPROXIMATE TRANSLATIONS OF UNFAMILIAR MEASUREMENT UNITS DURING DEEP QUESTION ANSWERING SYSTEM TRAINING AND USAGE

(71) Applicant: International Business Machines Corporation, Armonk, NY (US)

(72) Inventors: Edward G. Katz, Washington, DC (US); Charles E. Beller, Baltimore, MD (US); Stephen A. Boxwell, Franklin, OH (US); Kristen M. Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 16/552,379

(22) Filed: Aug. 27, 2019

(65) Prior Publication Data
US 2021/0064964 A1 Mar. 4, 2021

(51) Int. Cl.
*G06N 3/04* (2006.01)
*G06N 3/10* (2006.01)
*G06N 3/08* (2006.01)

(52) U.S. Cl.
CPC ............ *G06N 3/0427* (2013.01); *G06N 3/08* (2013.01); *G06N 3/105* (2013.01)

(58) Field of Classification Search
CPC ......... G06N 3/0427; G06N 3/08; G06N 3/105
See application file for complete search history.

(56) References Cited

U.S. PATENT DOCUMENTS

| | | | |
|---|---|---|---|
| 5,159,552 | A | 10/1992 | van Gasteren et al. |
| 6,636,880 | B1 | 10/2003 | Bera |
| 7,325,194 | B2 | 1/2008 | Moore et al. |
| 7,788,306 | B2 | 8/2010 | Dykes et al. |

(Continued)

OTHER PUBLICATIONS

Liu et al. ("A PUT-Based Approach to Automatically Extracting Quantities and Generating Final Answers for Numerical Attributes", Entropy 2016, vol. 18, No. 235, 2016, pp. 1-14) (Year: 2016).*

(Continued)

*Primary Examiner* — Miranda M Huang
*Assistant Examiner* — Robert Lewis Kulp
(74) *Attorney, Agent, or Firm* — Christopher M. Pignato

(57) ABSTRACT

A method learns approximate translations of unfamiliar measurement units during deep question answering (DeepQA) system training and usage. The DeepQA system receives a training set containing Question-Answer (QA) pairs having known unit-of-measurement terms, where each QA pair contains an answer having a known numeric value for a corresponding question from the QA pair. The DeepQA system receives a question from each QA pair from the training set to the DeepQA system in order to find answers and passage phrases to the question from each QA pair, and then identifies all found answers and passage phrases having values that are within a predetermined range of answer values of the training set, where one or more of the identified all found answers and passage phrases contain unfamiliar unit-of-measurement terms, in order to learn approximate translations of the unfamiliar unit-of-measurement terms.

12 Claims, 8 Drawing Sheets

(56) References Cited

U.S. PATENT DOCUMENTS

| | | | |
|---|---|---|---|
| 9,199,723 | B2 | 12/2015 | Yamasaki |
| 9,569,724 | B2 | 2/2017 | Ferucci et al. |
| 10,108,904 | B2 | 10/2018 | Bagchi et al. |
| 2004/0068528 | A1 | 4/2004 | Erickson |
| 2012/0330934 | A1 | 12/2012 | Duboue et al. |
| 2016/0180726 | A1* | 6/2016 | Ahuja .................... G06N 5/022 434/322 |
| 2017/0215028 | A1 | 7/2017 | Rhoads et al. |
| 2017/0372190 | A1 | 12/2017 | Bishop et al. |
| 2018/0011837 | A1* | 1/2018 | Beller .................... G06F 40/30 |
| 2019/0047715 | A1 | 2/2019 | Hedrick |
| 2020/0364511 | A1 | 11/2020 | Brown |
| 2021/0065028 | A1 | 3/2021 | Beller |
| 2021/0200954 | A1 | 7/2021 | Dsouza |
| 2022/0147544 | A1 | 5/2022 | Simard |

OTHER PUBLICATIONS

Gruss et al. ("By the numbers: The magic of numerical intelligence in text analytic systems", Decision Support Systems, vol. 113, 2018, pp. 86-98) (Year: 2018).*

Dua et al. ("DROP: A Reading Comprehension Benshmark Requiring Discrete Reasoning Over Paragaphs", http://arxiv.org/abs/1903.00161, arXiv:1903.00161v2[cs.CL], Apr. 16, 2019, pp. 1-12) (Year: 2019).*

Schierman et al. ("Adaptive Guidance with Trajectory Reshaping for Reusable Launch Vehicles", AIAA Guidance, Navigation, and Control Conference and Exhibit, Aug. 2002, pp. 1-11) (Year: 2002).*

P. Mell et al., "The NIST Definition of Cloud Computing", National Institute of Standards and Technology, Information Technology Laboratory, Sep. 2011, pp. 1-7.

Tamames, Javier et al. "Envmine: A Text-Mining System for the Automatic Extraction of Contextual Information." BMC Bioinformatics 11.1 (2010): 294, pp. 1-10.

A. Neelakantan et al., "Learning Dictionaries for Named Entity Recognition Using Minimal Supervision", <https://arxiv.org/abs/1504.06650>, In 14th Conference of the European Chapter of the Association for Computational Linguistic, 2014, submitted Apr. 24, 2015, pp. 1-10.

S. Ercan, "Question Answering With the Robotutor Nao", Delft University of Technology, Thesis, Aug. 17, 2017, 90 Pages.

P. Yin et al., "Answering Questions With Complex Semantic Constraints On Open Knowledge Bases", ACM, CIKM'15, 2015, pp. 1-10.

Anonymous, "Method of Computing Relevancy Score in a Question and Answering System", ip.com, IPCOM000222407D, Oct. 2, 2012, pp. 1-4.

Anonymous, "System and Method to Generate User Profiles Based on Question and Answer Interchange", ip.com, IPOM000238977D, Sep. 29, 2014, pp. 1-5.

Anonymous, "A Self-Diagnosing Question Answering System", ip.com, IPCOM000247244D, Aug. 17, 2016, pp. 1-6.

Anonymous, "Automatic Error Analysis Advisor for Question Answering Systems", ip.com, PCOM000247245D, Aug. 17, 016, pp. 1-6.

Ferrucci, D., et al., "Building Watson: An Overview of the DeepQA Project", 2010, AI Magazine, 31(3), 59-79. https://doi.org/10.1609/aimag.v31i3.2303.

List of IBM Patents or Patent Applications Treated as Related, Sep. 11, 2019.

* cited by examiner

LEARNING APPROXIMATE TRANSLATIONS OF UNFAMILIAR MEASUREMENT UNITS DURING DEEP QUESTION ANSWERING SYSTEM TRAINING AND USAGE

BACKGROUND

The present invention relates to the field of question answering systems. Still more specifically, the present invention relates to the field of handling unfamiliar measurement units when training and/or utilizing a deep question answering system.

SUMMARY

In an embodiment of the present invention, a method learns approximate translations of unfamiliar measurement units during deep question answering system training and usage. The deep question answering (DeepQA) system receives a training set containing Question-Answer (QA) pairs having known unit-of-measurement terms, where each QA pair contains an answer having a known numeric value for a corresponding question from the QA pair. The DeepQA system receives a question from each QA pair from the training set to the DeepQA system in order to find answers and passage phrases to the question from each QA pair, and then identifies all found answers and passage phrases having values that are within a predetermined range of answer values of the training set, where one or more of the identified all found answers and passage phrases contain unfamiliar unit-of-measurement terms. The DeepQA system defines the identified all found answers and passage phrases as hypothetical unit phrases for answering a particular type of question, and, for each hypothetical unit answer, infers a hypothetical numeric translation value based on the known numeric value from the answer in the training set. The DeepQA system compares the hypothetical numeric translation value for each hypothetical unit answer to numeric values from hypothetical numeric translation values that are applied to other answers and passage phrases from the identified all found answers and passage phrases, and evaluates how consistent the hypothetical numeric translation value is for each hypothetical unit answer from the identified all found answers and passage phrases. The DeepQA system utilizes how consistent the hypothetical numeric translation value is for each hypothetical unit answer to compute an overall translation value for the identified all found answers and passage phrases.

In one or more embodiments, the method(s) described herein are performed by an execution of a computer program product and/or a computer system.

DETAILED DESCRIPTION

Figure 1:
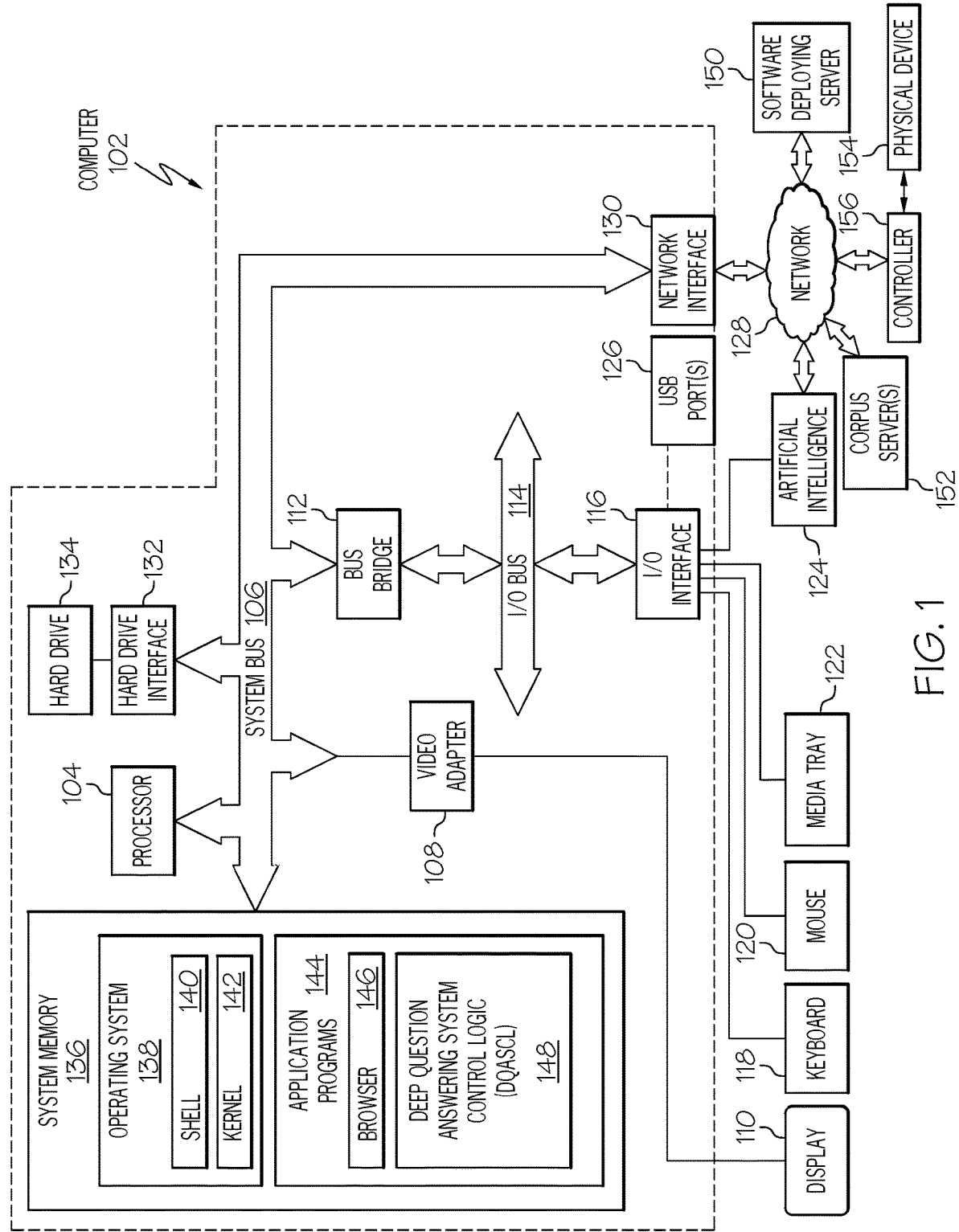
FIG. 1 depicts an exemplary system and network in which the present invention is implemented in various embodiments.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that can be utilized by and/or in the implementation of the present invention. Note that some or all of the exemplary architecture, including both depicted hardware and software, shown for and within computer 102 can be utilized by artificial intelligence 124 and/or software deploying server 150 and/or corpus server(s) 152 and/or physical device 154 and/or controller 156 shown in FIG. 1, and/or deep question answering system 202 shown in FIG. 2, and/or one or more of the neurons/nodes shown in the neural networks depicted in FIG. 5 and/or FIG. 6.

Exemplary computer 102 includes a processor 104 that is coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), an artificial intelligence 124, and external USB port(s) 126. While the format of the ports connected to I/O interface 116 can be any known to those skilled in the art of computer architecture, in one embodiment some or all of these ports are universal serial bus (USB) ports.

As depicted, computer 102 is able to communicate with a software deploying server 150 and/or the corpus server(s) 152 and/or the physical device 154 (via the controller 156) and/or the artificial intelligence 124 using a network interface 130 to a network 128. Network interface 130 is a hardware network interface, such as a network interface card (NIC), etc. Network 128 can be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Deep Question Answering System Control Logic (DQASCL) 148. DQASCL 148 includes code for implementing the processes described below, including those described in FIGS. 2-6. In one embodiment, computer 102 is able to download DQASCL 148 from software deploying server 150, including in an on-demand basis, wherein the code in DQASCL 148 is not downloaded until needed for execution. Note further that, in one embodiment of the present invention, software deploying server 150 performs all of the functions associated with the present invention (including execution of DQASCL 148), thus freeing computer 102 from having to use its own internal computing resources to execute DQASCL 148.

Also connected to computer 102 is a physical device 154, which is controlled by a controller 156. One or more examples of physical device 154 are presented below.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

Deep Question Answering (DeepQA) systems are trained by using training question answer pairs such as the following:

Training Question: What is the minimum approach speed for Aircraftx when the alert "RUDDER ASSIST DISABLED" is displayed?

Training Answer Key: 141 knots

That is, certain types of aircraft have two ways of controlling their rudder: manual and power assisted (hydraulic). Manual control of the rudder gives the pilot excellent tactile feedback, and is often preferred while at cruising speed, since only small movements of the rudder are required (or even allowed) at higher speeds to make the aircraft yaw (rotate about its vertical axis). However, at lower speeds, such as when the aircraft is taking off or landing, larger movements of the rudder movement are needed to make the aircraft yaw. As such, power assist (power assistance such as a hydraulic boost) is needed when taking off or landing the aircraft. Many aircraft have a minimum speed at which the power assist is needed. That is, although the aircraft might be landed at a higher speed, depending on the length of the runway, headwind, etc., thus making manual rudder control acceptable, under slower landing speeds, the power assist for the rudder is needed to cause the rudder to have greater movement.

Stated another way, in the example question/answer pair presented above, if Aircraft X is going slower than 141 knots when landing or taking off, then it must have power assistance for moving the rudder, such that the rudder will have enough movement to control the aircraft when landing/taking off at such low speeds. If the power assistance for the rudder is turned off, then a "RUDDER ASSIST DISABLED" alert is shown in the cockpit.

Therefore, the DeepQA system will look for a passage from a corpus of information (e.g., text documents, webpages, etc.) that includes key phrases, as contextually determined from the question. In this example, the key phrases could be "approach", "speed", "Aircraft X", and "RUDDER ASSIST DISABLED". In addition, assume that the DeepQA system has been trained to look for the key measurement unit "knots" when looking for information about speed and aircraft. That is, a measurement unit is defined herein as a metric (e.g., knots, mile, ounce, etc.) that is used to identify what a value is describing. Thus, in the term "141 knots", "knots" is the measurement unit, and "141" is the value that is described by "knots". In the present patent application, the terms "measurement unit" and "unit-of-measurement term" and "unit-of-measure term" are all used interchangeably.

In the example described above, if the DeepQA system is able to find a document (e.g., a first candidate corpus) that states, "The minimum approach speed for Aircraft X when the alert "RUDDER ASSIST DISABLED" is displayed is 141 knots", then returning the answer "141 knots" is a simple task.

However, there are times when the corpus contains measurement units that are unfamiliar to the DeepQA system.

For example, consider a second candidate corpus for answering the question "What is the minimum approach speed for Aircraft X when the alert "RUDDER ASSIST DISABLED" is displayed?":

Do not conduct autoland operations when on approach in Aircraft X if "RUDDER ASSIST DISABLED" alert is displayed, airport field elevation exceeds 8,000 MSL, or knots reading is too low.

This second candidate corpus does not answer the question "What is the minimum approach speed for Aircraft X when the alert "RUDDER ASSIST DISABLED" is displayed?", since "knots reading is too low" does not tell what the "minimum approach speed" is. However, the DeepQA system might return this passage anyway, since it includes the key terms "approach", "Aircraft X", and "RUDDER ASSIST DISABLED", and the term "knots" is also part of the passage and/or metadata for the passage.

Consider now a third candidate corpus for answering the question "What is the minimum approach speed for Aircraft X when the alert "RUDDER ASSIST DISABLED" is displayed?":

Do not attempt an approach or missed approach in Aircraft X if at less than 141 KIAS when "RUDDER ASSIST DISABLED" alert is displayed.

This third candidate corpus is an excellent source for answering the question "What is the minimum approach speed for Aircraft X when the alert "RUDDER ASSIST DISABLED" is displayed?", but it does not include the terms "speed" or "knots". That is, rather than use the term "knots" (which is shorthand for nautical miles per hour), the passage uses the term KIAS, which is an acronym for "knots indicated airspeed" (KIAS).

KIAS is an airspeed reading whose value is adjusted for current air density, pressure, humidity, altitude, etc., and thus is often more useful to the pilot than the uncalibrated "knots". However, the DeepQA system is unfamiliar with the term KIAS, and thus initially does not know what type of measurement unit ("speed") KIAS is.

Returning to the example above, since the third candidate corpus does not include "speed" or "knots", and if the first candidate corpus is not available (e.g., not found), then the DeepQA system will use the second candidate corpus, and generate the answer:

Airport field elevation exceeds 8,000 feet MSL.

This passage, although logical to the DeepQA system, is irrelevant and does not answer the question "What is the minimum approach speed for Aircraft X when the alert "RUDDER ASSIST DISABLED" is displayed?" Rather, this passage only specifically describes what to do if the airport field elevation is 8,000 feet above mean sea level (MSL).

As such, deep QA systems in the prior art often fail to generate, or fail to score highly, excellent answers to questions due to a reliance on restrictive (but incomplete) measurement unit type information that is derived from lexical answer type (LAT) detection and answer generation modules. That is, LAT detection uses context of a question to determine what it is asking about (e.g., operational parameters of an aircraft), and answer generation modules provide candidate answers to this question. However, if prior art deep QA systems find a term in a candidate answer that uses a measurement unit with which it is unfamiliar (e.g., KIAS), then it will often ignore that candidate answer, and/or heavily discount that candidate answer.

Furthermore, situations arise in which two terms do not use essentially identical units of measurement. That is, the two terms describe a same concept (e.g., speed) but use different scales (e.g., "nautical miles per hour—knots" and "miles per hour—MPH"). As such, in an embodiment of the present invention, the system not only recognizes two units of measurement as being for a same concept, but also convert the values used by the two units of measurement. For example, the system first recognizes that "knots" and "MPH" both refer to units of measurement for speed, and then converts the values to a same scale using either a lookup table of known conversions, or, preferably, an estimate of the conversions based on returned answers, as described below.

Figure 2:
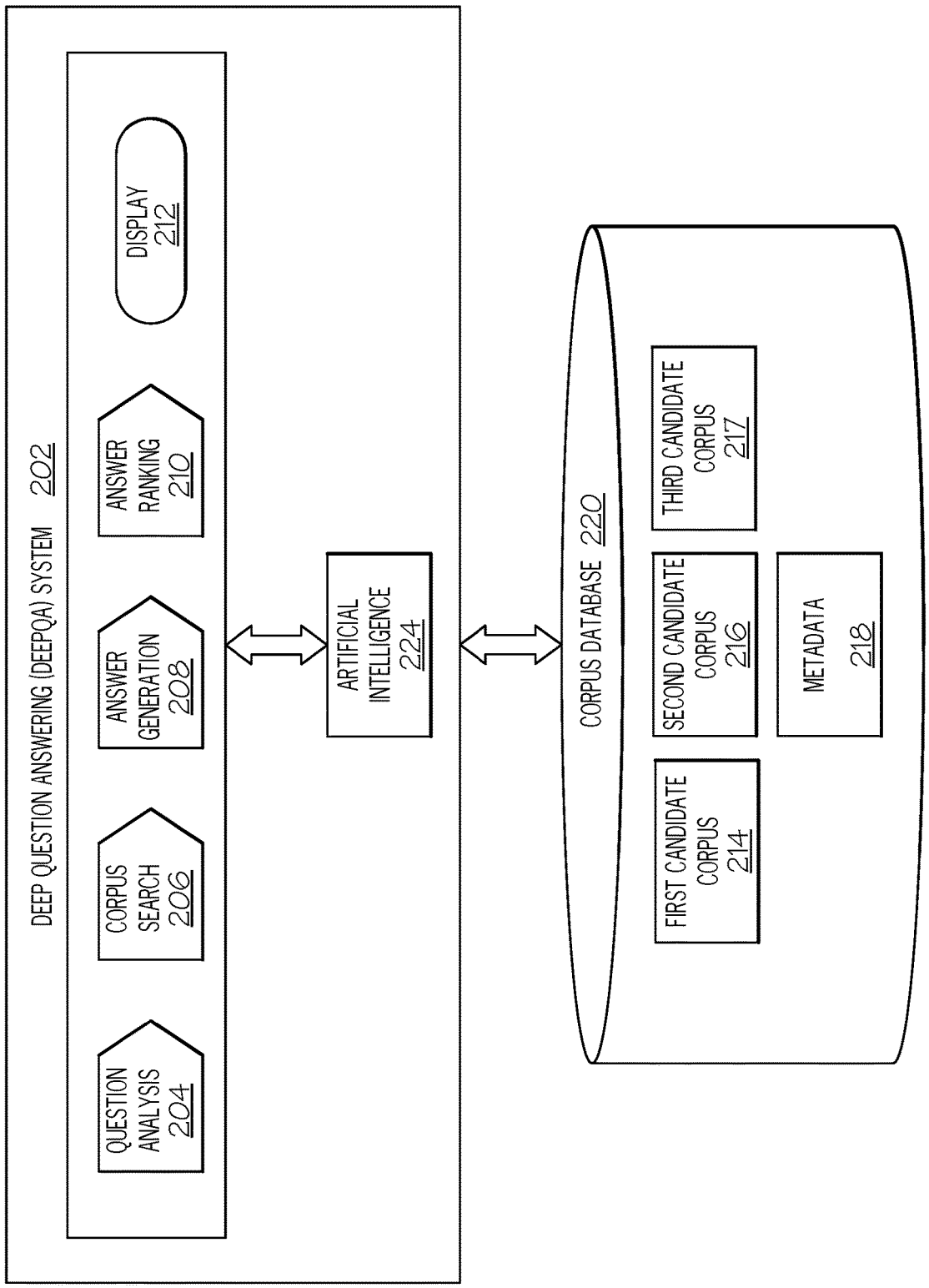
FIG. 2 illustrates a high-level overview of one or more embodiments of the present invention.

With reference now to FIG. 2, details of an exemplary deep question answering (DeepQA) system 202 as used in one or more embodiments of the present invention is presented.

DeepQA system 202 is a system that mines structured and/or unstructured information sources to answer a query/question. As shown in FIG. 2, DeepQA system 202 performs five fundamental steps.

First, as shown in block 204, the DeepQA system 202 analyzes a received question. For example, assume that a user (e.g., using a webpage that is supported by DeepQA system 302) enters the question, "What is the minimum approach speed for Aircraft X when the alert "RUDDER ASSIST DISABLED" is displayed?" The question analysis shown in block 204, using a natural language processing (NLP) algorithm and/or LAT detection, will determine that the question is asking about aircraft speed parameters when landing a particular aircraft. Some or all of these parameters can be part of metadata 218, which is associated with candidate answers/passages/corpuses within a corpus database 220 of documents, in order to initially identify the candidate corpuses. For example, any candidate corpus with the metadata "Aircraft X" and "RUDDER ASSIST DISABLED" could be considered to be candidate answers/passages. In an exemplary embodiment of the present invention, the corpus database 220 is supplied by the corpus server(s) 152 shown in FIG. 1 (but not depicted in FIG. 2).

As shown in block 206, the DeepQA system 202 then searches corpuses (i.e., bodies of information) from the corpus database 220, such as the first candidate corpus 214 and the second candidate corpus 216 and the third candidate corpus 217. For example, assume that metadata 218 associated with the first candidate corpus 214 and the second candidate corpus 216 and the third candidate corpus 217 include the metadata "Aircraft X" and "RUDDER ASSIST DISABLED".

For illustrative purposes, assume that first candidate corpus 214 states, "Do not attempt an approach or missed approach in Aircraft X if at less than 141 knots when "RUDDER ASSIST DISABLED" alert is displayed"; the second candidate corpus 216 states, "Do not conduct autoland operations when on approach in Aircraft X if "RUDDER ASSIST DISABLED" alert is displayed, airport field elevation exceeds 8,000 MSL, or knots reading is too low."; and the third candidate corpus 217 states "Do not attempt an approach or missed approach in Aircraft X if at less than 141 KIAS when "RUDDER ASSIST DISABLED" alert is displayed."

As shown in block 208, the DeepQA system 202 then generates multiple answers (in this example, three) to the question "What is the minimum approach speed for Aircraft X when the alert "RUDDER ASSIST DISABLED" is displayed?", including "141 knots", "Airport field elevation exceeds 8,000 feet MSL", and "141 KIAS". The generation of these answers (answer generation shown in block 208) and/or the ranking of the answers (answer ranking shown in block 210) are performed by artificial intelligence 224. In this example, the answer "141 knots" is initially ranked highest (since it includes the term "141 knots", which is in an answer key that is known to the DeepQA system 202), followed by the answer "141 KIAS" (which includes the value "141", but uses the unknown term "KIAS"), followed by "Airport field elevation exceeds 8,000 feet MSL", which contains neither "141" nor "knots".

The ranked answers are then presented on a display 212.

However, as stated above, assume for purposes of illustration that the first candidate corpus 214 (containing the best answer "141 knots") is either not in the corpus database 220, is blocked from being retrieved (e.g., by a security firewall), or is otherwise unavailable to the DeepQA system 202. As such, the only two candidate corpuses are the second candidate corpus 216 ("8,000 feet MSL") and the third candidate corpus 217 ("141 KIAS").

Figure 5:
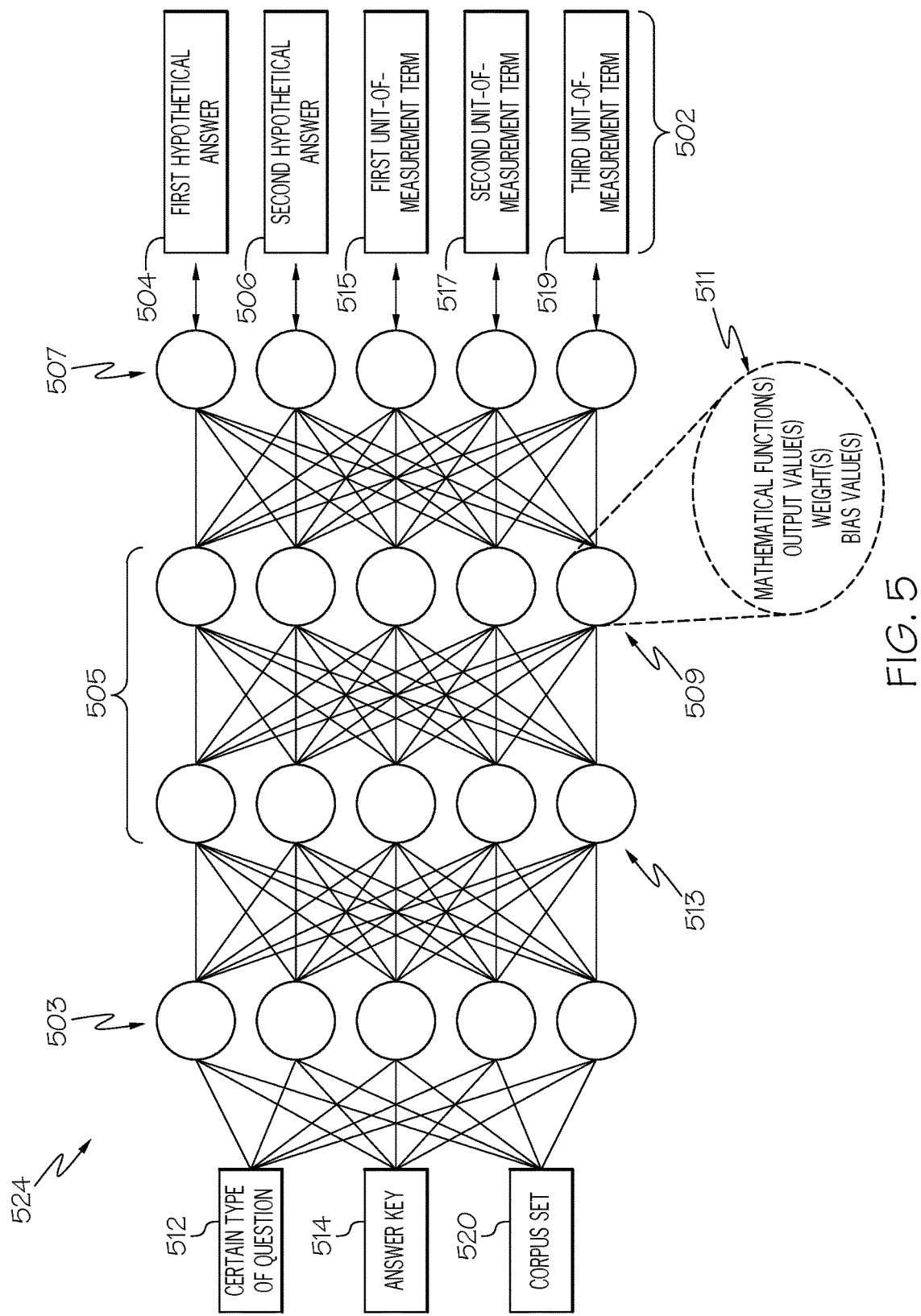
FIG. 5 and FIG. 6 depict exemplary deep neural networks as used in one or more embodiments of the present invention.
Figure 6:
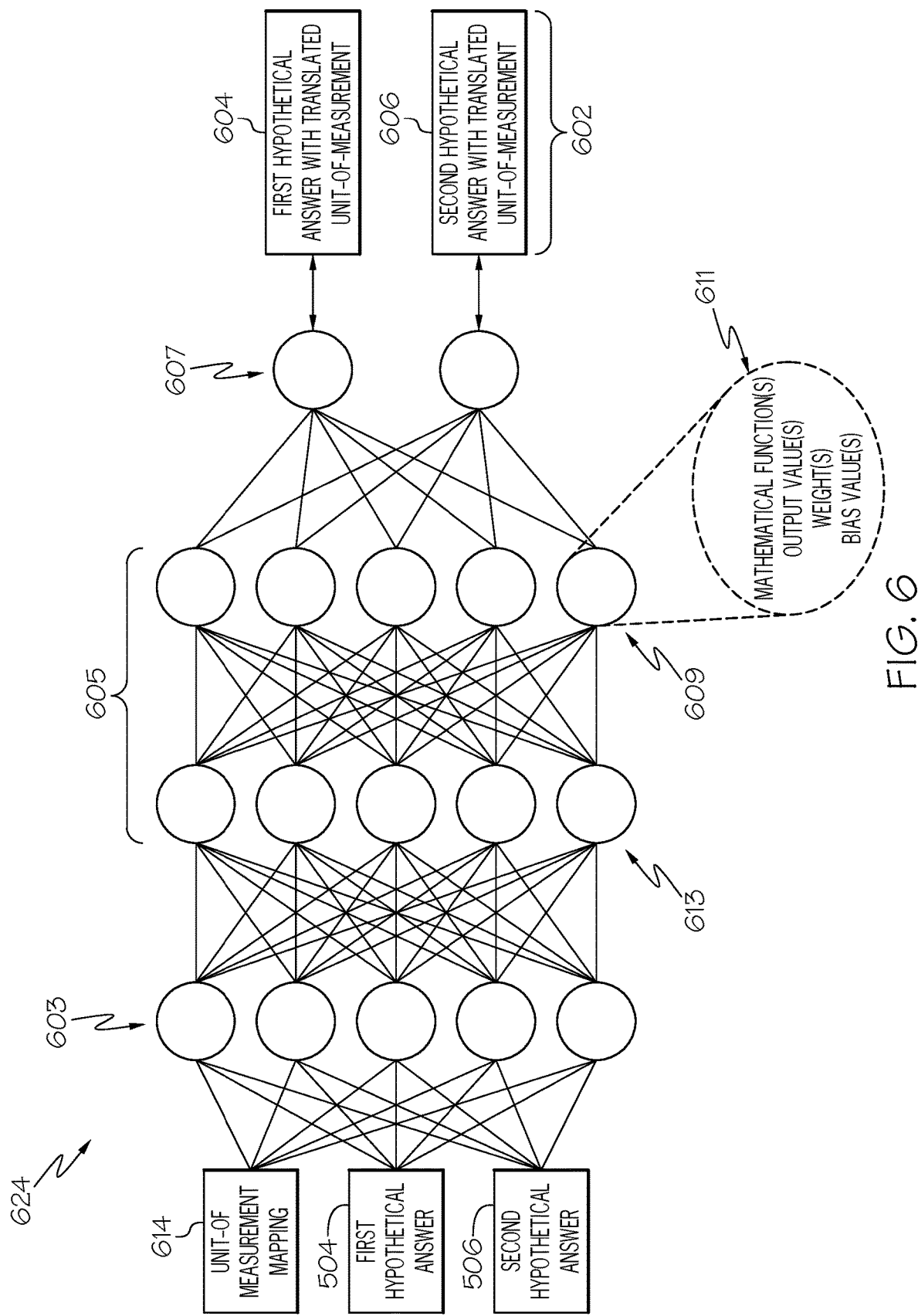

Also part of the DeepQA system is an artificial intelligence 224, described in exemplary form as answer generating deep neural network 524 in FIG. 5 and/or translation deep neural network 624 in FIG. 6. As described below, these neural networks are used to retrieve corpuses that answer the question using unfamiliar measurement units, and/or translate the unit values and/or the unfamiliar measurement units into a known/standardized value/measurement unit.

Figure 3:
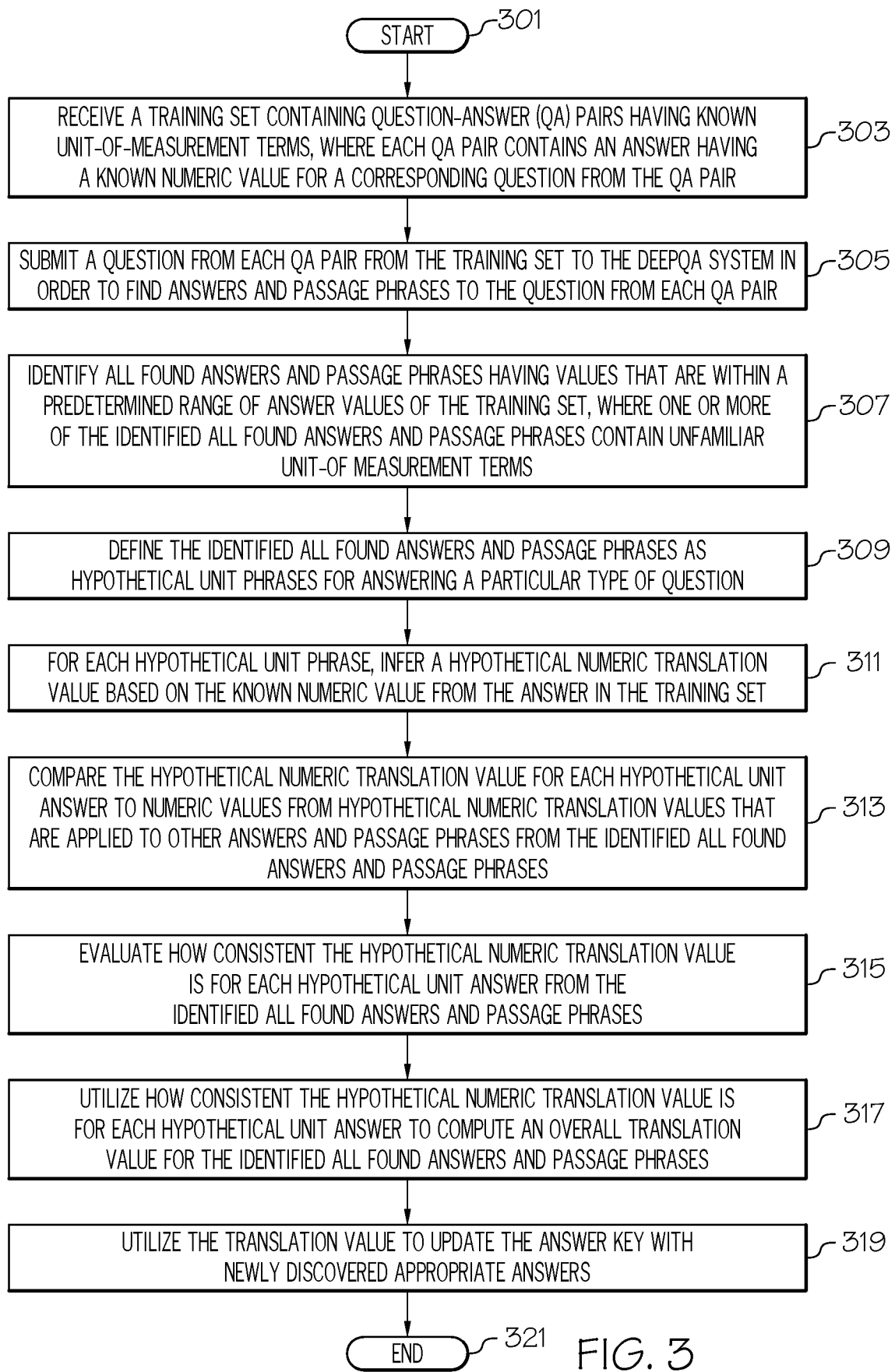
FIG. 3 is a high-level flow chart of one or more steps performed in accordance with one or more embodiments of the present invention.

With reference now to FIG. 3, a high-level overview of steps performed in one or more embodiments of the present invention is presented.

After initiator block 301, deep question answering (DeepQA) system (e.g., DeepQA 202 shown in FIG. 2) receives a training set containing Question-Answer (QA) pairs having known unit-of-measurement terms, as shown in block 303. This training set is used to train the artificial intelligence 224 shown in FIG. 2. Each QA pair in the training set contains an answer having a known numeric value, as well as a known unit-of-measurement, for a corresponding question from the QA pair, as shown in block 303. For example, a Question-Answer pair from the training set could be:

Training Question: What is the minimum approach speed for Aircraft X when the alert "RUDDER ASSIST DISABLED" is displayed?

Training Answer: 141 knots

In this example, "141" is the known numeric value, and "knots" is a known unit-of-measurement.

As shown in block 305, a question from each QA pair from the training set is submitted to the DeepQA system in order to find answers (e.g., an entire answer sentence or paragraph) and passage phrases (e.g., the key answer term itself, such as "141 knots") to the question from each QA pair. For example, the question being submitted to the DeepQA system could be the question "What is the minimum approach speed for Aircraft X when the alert "RUDDER ASSIST DISABLED" is displayed?", or it could be a same type of question, although not the exact same question and/or having the exact same wording (e.g., "How fast can Aircraft X be going during landing without rudder assistance"). However, a semantic analysis by the DeepQA system will determine that these two questions are actually asking the same thing.

As described in block 307, the DeepQA system then identifies all found answers and passage phrases having values that are within a predetermined range of answer values of the training set, where one or more of the identified all found answers and passage phrases contain unfamiliar unit-of-measurement terms. That is, the DeepQA system is looking for an answer that is "close" to that found in the answer key.

In the example above, while both the provided answer (141 knots) and the passage generated phrase (141 KIAS) share a numeric prefix, they lack an exact match. However, they both include the value "141". Thus, they are "close" to the answer key.

In another embodiment, the numbers do not exactly match, but they are close in value. For example, the value "143" is within a predefined range (e.g., 2) of the training value "141". Thus, it is "close" to the answer key.

In another embodiment, the numbers do not match, but they are multiples of one another. More specifically, round multiples of the number (e.g., 2×, 3×, 4×, etc.) are considered good answers, on the theory that a new value is likely to be some round multiple of a known one. Thus, even though they are numerically distant from the answer key value, they are still considered to be "close" to the answer key.

If close numbers and no round multiples of the number are found, then the DeepQA system considers, as candidate answers, terms in which follow-on numbers occur frequently. For example, assume that the term from the answer key is "141 knots", which is not found in the candidate documents. However, assume that hundreds, if not thousands, of candidate answers have the same value/measurement unit "141 KIAS". As such, this high frequency is used to determine that "knots" and "KIAS" are both related to aircraft speed.

In one or more embodiments of the present invention, some or all of the strategies presented above are used and associated with different uncertainty weights. For example, a passage with a value that is within a predefined range (i.e., "143" is only two away from "141") can be weighted more heavily than a passage with a value that is a round multiple of "141", which is weighted more heavily than a passage with a value and measurement unit that is frequently used.

Figure 4:
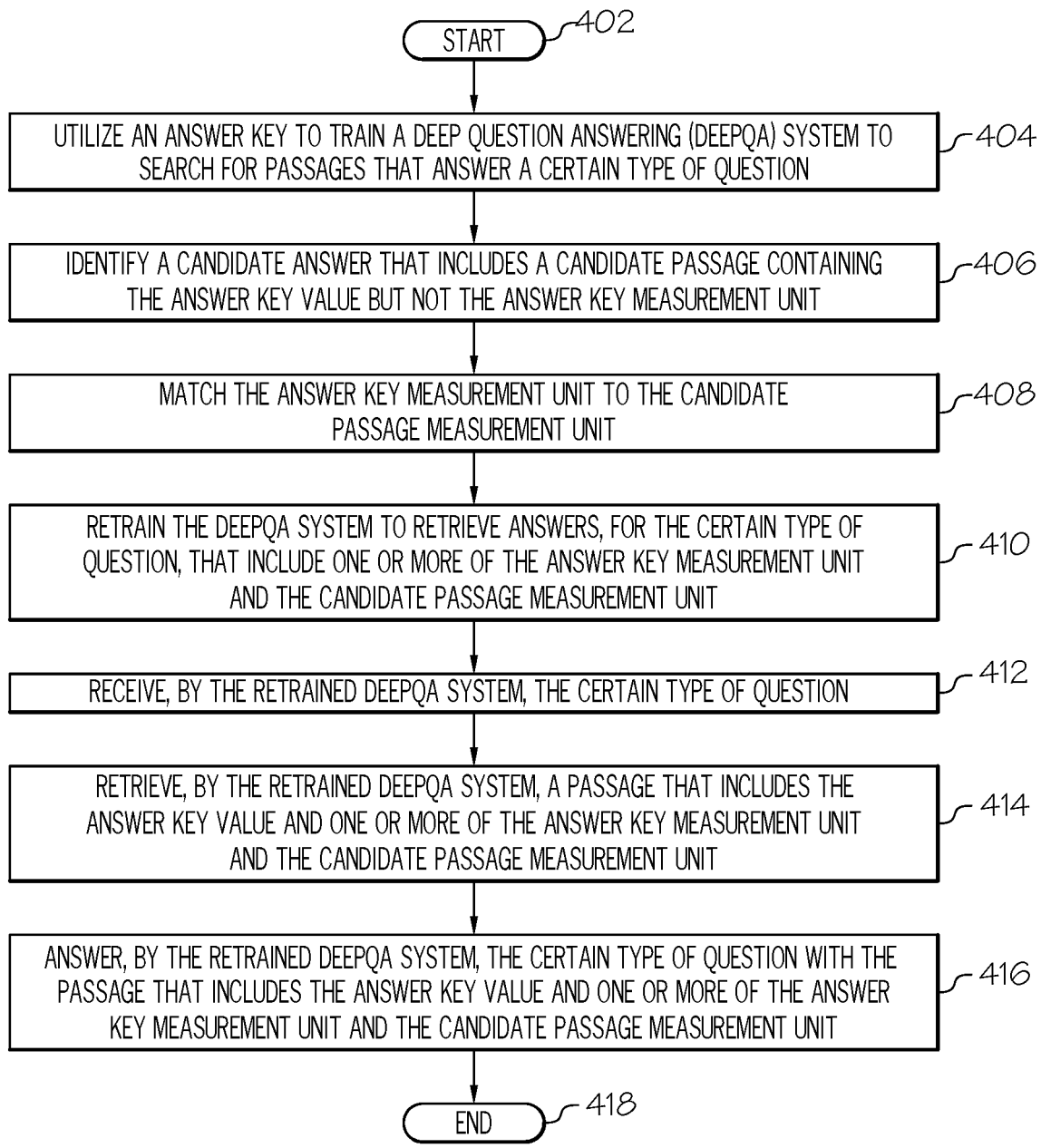
FIG. 4 is a high-level flow chart of one or more steps performed to find answers that are close to an answer key in accordance with one or more embodiments of the present invention.

With reference to FIG. 4, a high-level flow chart of steps performed in an embodiment of the present invention for identifying answers/passage phrases that are closest to the answer key (as described in block 307 in FIG. 3) is presented.

After initiator block 402, one or more processors (e.g., processor 104 in computer 102) and/or a user utilize an answer key to train a deep question answering (QA) system to search for passages that answer a certain type of question, as described in block 404.

As described in block 406, the processor(s) and/or user identify a candidate answer that includes a candidate corpus containing the answer key value (e.g., "141") but not the answer key measurement unit (e.g., "knots"). Thus, the candidate corpus measurement unit (e.g., "KIAS"), and not the answer key measurement unit (e.g., "knots"), is associated with the answer key value (e.g., "141").

As described in block 408, the processor(s) and/or user match the answer key measurement unit to the candidate corpus measurement unit based on the answer key measurement unit and the candidate corpus measurement unit both being associated with the answer key value. For example, the answer key measurement unit (e.g., "knots") and the candidate corpus measurement unit (e.g., "KIAS") both describe/are associated with the answer key value "141".

As described in block 410, the processor(s) and/or user retrain the DeepQA system to retrieve answers, for the certain type of question, that include one or more of the answer key measurement unit and the candidate corpus measurement unit. That is, the deep neural network (i.e., the DeepQA system) is retrained to be able to retrieve answers that have one or more of the answer key measurement unit (e.g., "knots") and the candidate corpus measurement unit (e.g., "KIAS").

As described in block 412, the retrained DeepQA system receives the certain type of question (e.g., a question about aircraft landing speed and rudder control). For example, the training question might have been "What is the minimum approach speed for Aircraft X when the alert "RUDDER ASSIST DISABLED" is displayed?", while the runtime question might be "How fast should Aircraft X be going when landing in order for it to be acceptable for "RUDDER ASSIST DISABLED" to be displayed?" Nonetheless, they are both the same certain type of question (i.e., a question about aircraft landing speed and rudder control).

As described in block 414, the retrained DeepQA system retrieves a passage that includes the answer key value and one or more of the answer key measurement unit and the candidate corpus measurement unit. That is, the retrained DeepQA system returns passages/answers that include the answer key's value (e.g. "141") along with one or more of the answer key measurement unit (e.g., "knots") and the candidate corpus measurement unit (e.g. "KIAS").

As described in block 416, the retrained DeepQA system answers the certain type of question with the passage that includes the answer key value and one or more of the answer key measurement unit and the candidate corpus measurement unit, and returns it to the DeepQA system 202 described above in FIG. 2.

The flow chart in FIG. 4 terminates at terminator block 418.

Returning now to FIG. 3, and as shown in block 309, the DeepQA system defines the identified all found answers and passage phrases as hypothetical unit phrases for answering a particular type of question. That is, all returned answers, having various unit-of-measurement terms, are considered to be candidate (hypothetical) unit phrases for answering the question.

As shown in block 311, the DeepQA system then infers, for each hypothetical unit answer, a hypothetical numeric translation value based on the known numeric value from the answer in the training set.

For example, assume that the answer key holds the answer "141 knots". Assume further that a hypothetical unit answer (found in a retrieved passage from the corpus database) holds the answer "144 KIAS". As such, and in a simple example, the hypothetical numerical translation value could be the value from the known answer (141) divided by the value from the returned answer (144), or 141/144=0.98. That is, answers that return an answer using KIAS as the unit-of-measurement term are now assumed to be off-scale when compared to knots, since KIAS have adjusted the aircraft's airspeed using factors discussed above. Thus, when an answer that uses the unit-of-measurement term "KIAS" is found, it will be multiplied by 0.98, in order to return the value that is equivalent when using the "knots" unit-of-measurement term. In this example, then, 144 KIAS× 0.98=141 knots.

As described in block 313, the DeepQA system compares the hypothetical numeric translation value for each hypothetical unit answer to numeric values from hypothetical numeric translation values that are applied to other answers and passage phrases from the identified all found answers and passage phrases. That is, if the answer key contains the answer "141 knots", then the translation of all of the identified/found answers are evaluated to see how consistently they use a certain hypothetical numeric translation value to get close to the answer "141 knots".

As described in block 315, the DeepQA system evaluates how consistent the hypothetical numeric translation value is for each hypothetical unit answer from the identified all found answers and passage phrases.

In an embodiment of the present invention, this step is performed iteratively by evaluating each incoming answer against all previously returned answers. In an embodiment of the present invention, this step is performed globally, in which the system waits until it has found all mappings from the current QA set plus the corpus, and then evaluates each one against the others.

An evaluation of the consistent use of each unfamiliar term found in a set of answers considers all mappings that contain that unfamiliar term. For example, the term KIAS may appear in three mappings: [1 knots->1 KIAS, 1 knots->1 KIAS, 1 mph->0.87 KIAS], where the two duplicate mappings came from two separate hypothesized unit phrases.

If multiple found mappings share the same known unit (as in the above case), a degree of consistency can be established by direct numeric comparison along with a tolerance threshold. For example, assume that there are numerous answers to the question "What is the minimum approach speed for Aircraft X when the alert "RUDDER ASSIST DISABLED" is displayed?" that include the term "162 MPH". The system will assume that "141 knots" and "162 MPH" mean the same thing, simply based on the prevalence (majority) of the answers to the question "What is the minimum approach speed for Aircraft X when the alert "RUDDER ASSIST DISABLED" is displayed?" containing the term "162 MPH".

In a case where units map on to different known units, the system evaluates the consistency of the mappings between known units. In this case, the system automatically converts miles per hour (mph) into KIAS, such that 1 MPH is converted into 0.87 KIAS, thus making all mappings consistent.

In cases where not all mappings are consistent (within a tolerance threshold), the system calculates a majority decision (i.e., what value is returned by a majority of the answers) and a variance score (i.e., how far off from the answer key the returned answers are). If variance is low and the majority decision indicates a plausible mapping (e.g., between "knots" and "KIAS", indicating that they are the same unit-of-measurement), the system accepts that mapping with some lower degree of confidence.

In some cases, there will not be a clear majority decision, or the variance will be high. In these cases, the confidence will be low enough that some embodiments may simply discard the unfamiliar term due to a failure to learn. As such, and in an embodiment of the present invention, the DeepQA system requires a minimum number of mappings in order to assess consistency and reach a degree of confidence. Alternatively, the DeepQA system adjusts the degree of confidence based on the number of mappings. This would address the concern that, for example, a single mapping may be found that is simply an anomaly.

In some cases, there could be mappings that are inconsistent in type, for example [1 knots->1 KIAS, 1 Gallon->0.3 KIAS]. Unless there is a clear majority decision in favor of one compatible type, and others can be listed as outliers, the unfamiliar term (Gallon) is discarded.

Returning again to FIG. 3, and as shown in block 317, the DeepQA system then utilizes how consistent the hypothetical numeric translation value is for each hypothetical unit answer to compute an overall translation value for the identified all found answers and passage phrases.

In an embodiment of the present invention, this step takes all consistent (majority decision) individual mappings and averages the mapped values. For example, assume that the returned answers return a mapping set of [1 knots->1.0 KIAS, 1 knots->1.05 KIAS, 1.15 mph->1.0 KIAS, 1 Gallon->0.3 KIAS]. The outlier "Gallon" mapping is discarded. Thus, the three values for KIAS are 1, 1.05, and 1.0, which are averaged (1+1.05+1.0 divided by three=1.02), thus leading the automatic conversion of knots to KIAS by multiplying knots by 1.02 to return KIAS, or by multiplying KIAS by 0.98 (1 divided by 1.02) to return knots.

Thus, the previously unfamiliar term "KIAS" is not only automatically identified as being a measurement of speed, but is also automatically converted to or from "knots".

In an alternative embodiment, if a majority of the returned answers show the same value as the key (e.g., 141) when using the unfamiliar unit-of-measurement terms KIAS, then a majority rules mapping resulting in 1 KIAS being mapped to (converted into) 1 knot.

Returning now to FIG. 3, and as shown in block 319, in an embodiment of the present invention, the DeepQA system utilizes the overall translation value to update an answer key with newly discovered appropriate answers and passage phrases. For example, if a determination is made that "KIAS" is equivalent to "knots", and the answer is "141 knots", then the answer key will be updated to include the answer "141 KIAS" as the answer to the question "What is the minimum approach speed for Aircraft X when the alert "RUDDER ASSIST DISABLED" is displayed?"

The flow-chart shown in FIG. 3 terminates at terminator block 321.

In an embodiment of the present invention, an answer key value in the answer key and an answer value in one or more of the identified all found answers and passage phrases that contain unfamiliar unit-of-measurement terms are exact matches. For example, the answer key will be "141 knots" and the retrieved answer/passage phrases are "141 KIAS".

In an embodiment of the present invention, an answer key value in the answer key and an answer value in one or more of the identified all found answers and passage phrases that contain unfamiliar unit-of-measurement terms are within a predefined range. For example, the answer key will be "141 knots" and the retrieved answer/passage phrases are "142 KIAS", which are still within a predefined range (e.g., within 2 units) of the key answer.

In an embodiment of the present invention, a trained DeepQA system (which has now been trained to recognize the previously unfamiliar unit-of-measurement terms, such as KIAS) receives a new question. That is, the trained DeepQA system has been trained to recognize the unfamiliar unit-of-measurement terms as being equivalent to the known unit-of-measurement terms.

The trained DeepQA system receives a question that is similar to, but not exactly like, the question from the training set. For example, instead of receiving the training question "What is the minimum approach speed for Aircraft X when the alert "RUDDER ASSIST DISABLED" is displayed?", the trained DeepQA system receives a new question "How fast should Aircraft X be going when landing in order for it to be acceptable for "RUDDER ASSIST DISABLED" to be displayed?"

As such, the DeepQA system analyzes the new question to determine a lexical answer type (LAT) analysis for the new question. That is, these two questions are the same type of question (according to their lexical answer type—LAT), but ask similar questions in different ways. However, both questions ask about the aircraft speed at which rudder power assistance is needed during landing/takeoff.

The DeepQA system then generates answers, to the new question, that one or more of the all found answers and passage phrases contain unfamiliar unit-of-measurement terms, and then selects an answer based on a matching to the LAT and the hypothetical numeric translation value, as described above.

In one or more embodiments, the present invention uses an electronic neural network, which is an example of the artificial intelligence 224 shown in FIG. 2, to identify correlations between answers and their measurement units.

In various embodiments of the present invention, the artificial intelligence 224 shown in FIG. 2 is a Deep Neural Network (DNN), a Convolutional Neural Network (CNN), and/or another type of machine learning system. In a preferred embodiment, a Deep Neural Network is used to evaluate text/numeric data in a document from the corpus database 220.

Logic units within an electronic neural network are referred to as "neurons" or "nodes". If the electronic neural network is implemented entirely in software, then each neuron/node is a separate piece of code (i.e., instructions that perform certain actions). If the electronic neural network is implemented entirely in hardware, then each neuron/node is a separate piece of hardware logic (e.g., a processor, a gate array, etc.). If the electronic neural network is implemented as a combination of hardware and software, then each neuron/node is a set of instructions and/or a piece of hardware logic.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are often only "excitatory" to varying degrees.

In an electronic neural network, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often one or more nodes for holding vector information.

With reference now to FIG. 5, an answer generating Deep Neural Network (DNN) 524 used to evaluate textual data in one or more embodiments of the present invention is presented. For example, assume, for illustrative purposes, that a certain type of question 512 is the training question described above, "What is the minimum approach speed for Aircraft X when the alert "RUDDER ASSIST DISABLED" is displayed?" Assume also that the answer key 514 is "141 knots". As such, the certain type of question 512 and the answer key 514 are entered into the input layer 503 of the deep neural network 524 in order to train the DNN 524 to output the first unit-of-measurement term 515 (e.g., "knots"), the second unit-of-measurement term 517 (e.g., "KIAS"), and the third unit-of-measurement term 519 (e.g., "miles per hour", or "MPH"), as well as a first hypothetical answer 504 (e.g., "141 knots") and a second hypothetical answer 506 (e.g., "141 KIAS"), as obtained from corpuses from the input corpus set 520 (e.g., the first candidate corpus 214, the second candidate corpus 216, and the third candidate corpus 217 from the corpus database 220 shown in FIG. 2).

As shown in FIG. 5, the electronic neurons in DNN 524 are arranged in layers, known as the input layer 503, hidden layers 505, and an output layer 507. The input layer 503 includes neurons/nodes that take input data, and send it to a series of hidden layers of neurons (e.g., hidden layers 505), in which neurons from one layer in the hidden layers are interconnected with all neurons in a next layer in the hidden layers 505. The final layer in the hidden layers 505 then outputs a computational result to the output layer 507, which is often multiple nodes, each of which holds vector information. In an embodiment of the present invention, each neuron in the output layer 507 is associated with a particular response from output 502, as shown in FIG. 5.

As just mentioned, each node in the depicted DNN 524 represents an electronic neuron, such as the depicted neuron 509. As shown in block 511, each neuron (including neuron 509) includes multiple features, such as: a mathematical function, an output value, a weight, and a bias value.

The mathematical function is a mathematic formula for processing data from one or more upstream neurons. For example, assume that one or more of the neurons depicted in the middle hidden layers 505 send data values to neuron 509.

Neuron 509 then processes these data values by executing the mathematical function shown in block 511, in order to create one or more output values, which are then sent to another neuron, such as another neuron within the hidden layers 505 or a neuron in the output layer 507. The mathematical function shown in block 511 is an algorithm that determines that "knot" and "KIAS" are synonymous, based on their context, frequency of use, etc. in the corpus set 520, as described above.

Each neuron also has a weight that is specific for that neuron and/or for other connected neurons.

Furthermore, the output value(s) are added to bias value(s), which increase or decrease the output value, allowing the DNN 524 to be further "fine tuned".

For example, assume that neuron 513 is sending the results of its analysis of a piece of data to neuron 509. Neuron 509 has a first weight that defines how important data coming specifically from neuron 513 is. If the data is important, then data coming from neuron 513 is weighted heavily, and/or increased by the bias value, thus causing the mathematical function(s) within neuron 509 to generate a higher output, which will have a heavier impact on neurons in the output layer 507. Similarly, if neuron 513 has been determined to be significant to the operations of neuron 509, then the weight in neuron 513 will be increased, such that neuron 509 receives a higher value for the output of the mathematical function in the neuron 513. Alternatively, the output of neuron 509 can be minimized by decreasing the weight and/or bias used to affect the output of neuron 509. These weights/biases are adjustable for one, some, or all of the neurons in the DNN 524, such that a reliable output will result from output layer 507. Such adjustments are alternatively performed manually or automatically.

When manually adjusted, the weights and/or biases are adjusted by the user in a repeated manner until the output from output layer 507 matches expectations. For example, assume that DNN 524 is being trained to generate the first unit-of-measurement 515 (e.g., "knots"), the second unit-of-measurement 517 (e.g., "KIAS"), and the third unit-of-measurement term 519 (e.g., "MPH") when the certain type of question 512 (i.e., about the state of a rudder on an aircraft when landing) and the answer key 514 ("141 knots") and the corpus set 520 are entered into input layer 503. As such, when input layer 503 receives the certain type of question 512 and the answer key 514 and the corpus set 520 during training, then the neurons within the answer generating deep neural network 524 are adjusted such that the answer generating deep neural network 524 outputs the first unit-of-measurement 515 ("knots"), the second unit-of-measurement 517 ("KIAS"), and the third unit-of-measurement 519 ("MPH"). The weights/biases thus adjust the answer generating deep neural network 524 to cause the exemplary output 502 depicted in FIG. 5.

When automatically adjusted, the mathematical functions, output values, weights, and/or biases are adjusted using "back propagation", in which a "gradient descent" method determines how each mathematical function, output value, weight, and/or bias should be adjusted in order to provide an output 502 that is accurate (as determined by a subject matter expert reviewer, and/or other analytical software).

Once the answer generating deep neural network 524 shown in FIG. 5 is trained using the certain type of question 512 and the answer key 514, it is now ready to become a translation deep neural network 624, as shown in FIG. 6, and can be used to locate answers to similar types of questions as the certain type of question 514 used in training. Alternatively, the translation deep neural network 624 and the answer generating deep neural network 524 are different neural networks, each of which has been specifically trained to perform the functions described herein.

As described above, the certain type of question 512 could have been "What is the minimum approach speed for Aircraft X when the alert "RUDDER ASSIST DISABLED" is displayed?", while the certain type of question 512 used at runtime could be "How fast should Aircraft X be going when landing in order for it to be acceptable for "RUDDER ASSIST DISABLED" to be displayed?" Both questions are taxonomically related to the question about how fast the aircraft needs to be flying if the rudder is to be controlled manually.

As such, the translation deep neural network 624 uses as inputs a unit-of-measurement mapping 614 (e.g., 1 knot=1 KIAS; 1 knot=1.15 MPH), the first hypothetical answer 504 ("141 knots") and the second hypothetical answer 506 ("141 KIAS") generated by the answer generating deep neural network 524 to the certain type of question 512. These inputs (614, 504, 506) cause the translation deep neural network 624 to output a first hypothetical answer with translated unit-of-measurement 604 (i.e., "141 KIAS" has been translated into "141 knots") and a second hypothetical answer with translated unit-of-measurement 606 (i.e., "162 MPH" has been translated into "141 knots").

While the input layer 603, hidden layers 605, output layer 607, neuron 613, and neuron 609 in FIG. 6 are similar to their respective input layer 503, hidden layers 505, output layer 507, neuron 513, and neuron 509 in FIG. 5, the elements in block 611 have now been adjusted to align terms that use "KIAS" with "knots" since they 1) have the same value (e.g., "141") as the key; 2) have a value ("142") that is close to that in the key ("141"); and/or 3) are used by more candidate corpuses than any other measurement term. That is, one or more of the features in block 611 have been adjusted to recognize that "knot" is equivalent to "KIAS", and "MPH" can be converted to "knots" by dividing by the MPH answer by 1.15 (or multiplying KIAS by 0.87).

This allows the translation deep neural network 624 to output one or more outputs in output 602, including the first hypothetical answer with translated unit-of-measurement 604 (i.e., "141 KIAS" has been translated into "141 knots") a second hypothetical answer with translated unit-of-measurement 606 (i.e., "162 MPH" has been translated into "141 knots"). The first hypothetical answer with translated unit-of-measurement 604 is ranked higher than the second hypothetical answer with translated unit-of-measurement 606, since the first hypothetical answer with translated unit-of-measurement 604 required only a change to the unit-of-measurement "KIAS", without changing the value "141" in the answer "141 KIAS", and displayed on the display 212 in FIG. 2 accordingly.

The output 602 can be values/measurement units, as described herein, and/or a physical action event. For example, assume that the translation deep neural network 624 controls a physical aircraft. Assume further that, when trained, the translation deep neural network 624 is able to recognize that the aircraft is flying too slow to use manual control of its rudder. As such, the translation deep neural network 624 (e.g., artificial intelligence 124 shown in FIG. 1) will automatically activate the auto-assist (hydraulic) system for controlling the rudder by issuing instructions to controller 156 shown in FIG. 1, thus controlling the rudder (physical device 154).

In an embodiment of the present invention, the method further comprises analyzing the certain type of question to determine a lexical answer type (LAT) for the certain type of question; matching the LAT to the candidate corpus measurement unit; and selecting an answer to the certain type of question based on the matching of the LAT to the candidate corpus measurement unit. For example, and with reference to FIG. 2, the question analysis in block 204 of the DeepQA system 202 analyzes the question to determine a lexical answer type (LAT) for that question. The LAT is a description of what type of information is being sought (e.g., landing speed of an aircraft and rudder control). The DeepQA system matches the LAT to the candidate corpus measurement unit, and selects an answer to the certain type of question based on the matching of the LAT to the candidate corpus measurement unit, as performed by the corpus search in block 206 and the answer generation in block 208.

In an embodiment of the present invention, the method further comprises assigning an uncertainty value of the answer key measurement unit matching the candidate corpus measurement unit; and generating answers to the certain type of question utilizing terms that have the assigned uncertainty. That is, the DeepQA system 202 shown in FIG. 2 assigns an uncertainty value for how certain the DeepQA system is that the answer key measurement unit (e.g., "knots") and the candidate corpus measurement unit (e.g., "KIAS") are both measurements of speed. Thus, assume that the DeepQA system is only 70% certain that "KIAS" is also a measurement of speed. As such, any passage that has the answer key value along with a measurement unit that the DeepQA system is 70% sure also is a measurement of speed (e.g., "parsec"), will be returned as a candidate answer. In this example, the answer would be wrong, since "parsec" is a measurement unit of distance, not speed. However, if many answers contained the phrase "141 parsecs", then the system might return those answers anyway. A subject matter expert (SME) would then remove "parsec" from the lexicon of speed measurement terms used by the DeepQA system.

In an embodiment of the present invention, the answer key utilizes one or more ground truth measurement units for the answer key measurement unit. For example, the answer key measurement unit could be "knots", which is derived from an aircraft instrument that produces speeds in the format of "X knots". This instrument output is referred to as a "ground truth", since it is observed and described ("grounded") in reality observations.

While the present invention is described for exemplary purposes as answering a question about rudder control on an aircraft, the scope of the present invention is not limited to rudder control questions, or even to aircraft questions. Rather, the present invention is applicable to any artificial intelligence based question answering system that encounters measurement units with which it is unfamiliar when retrieving answers to questions.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
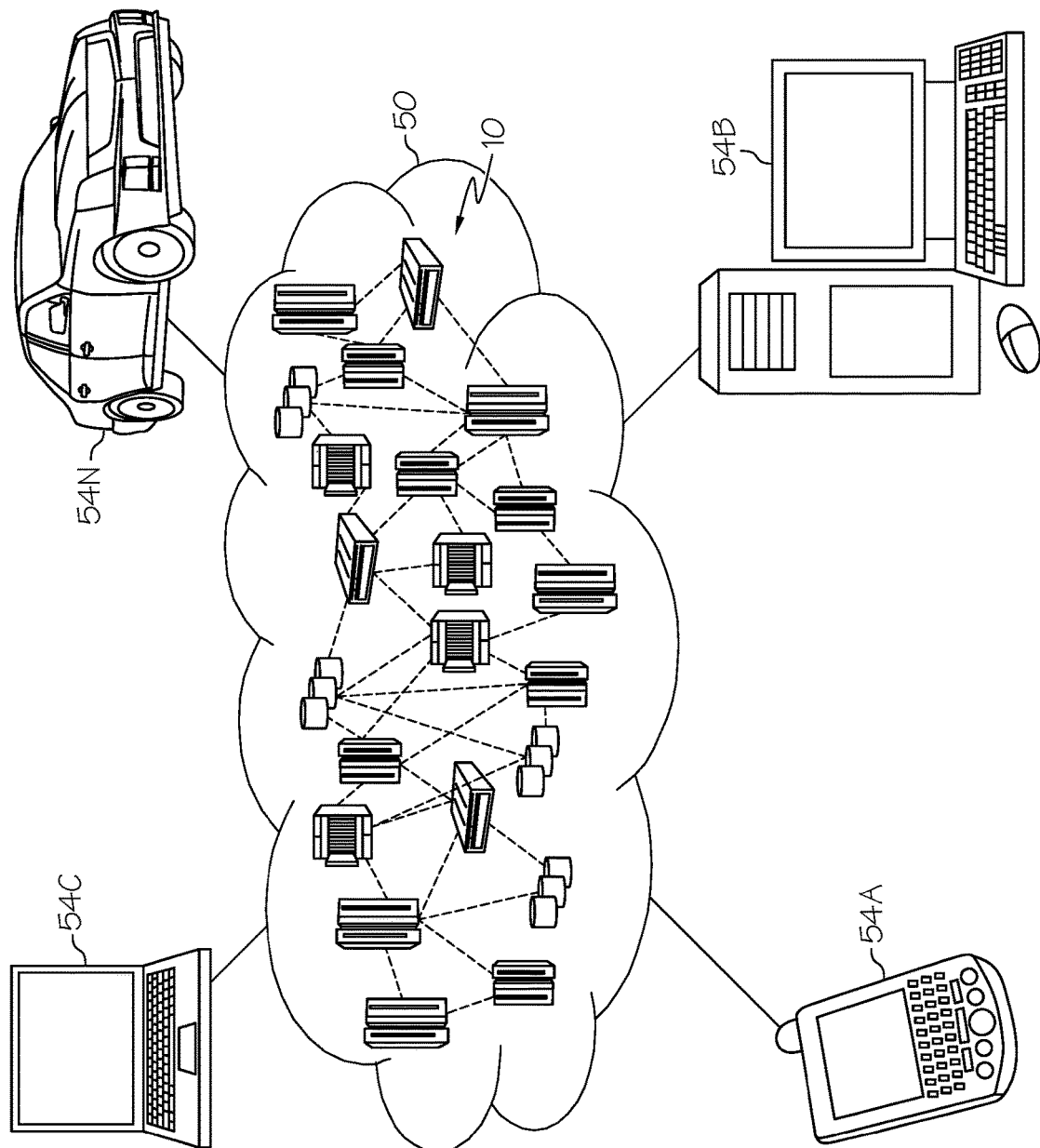
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
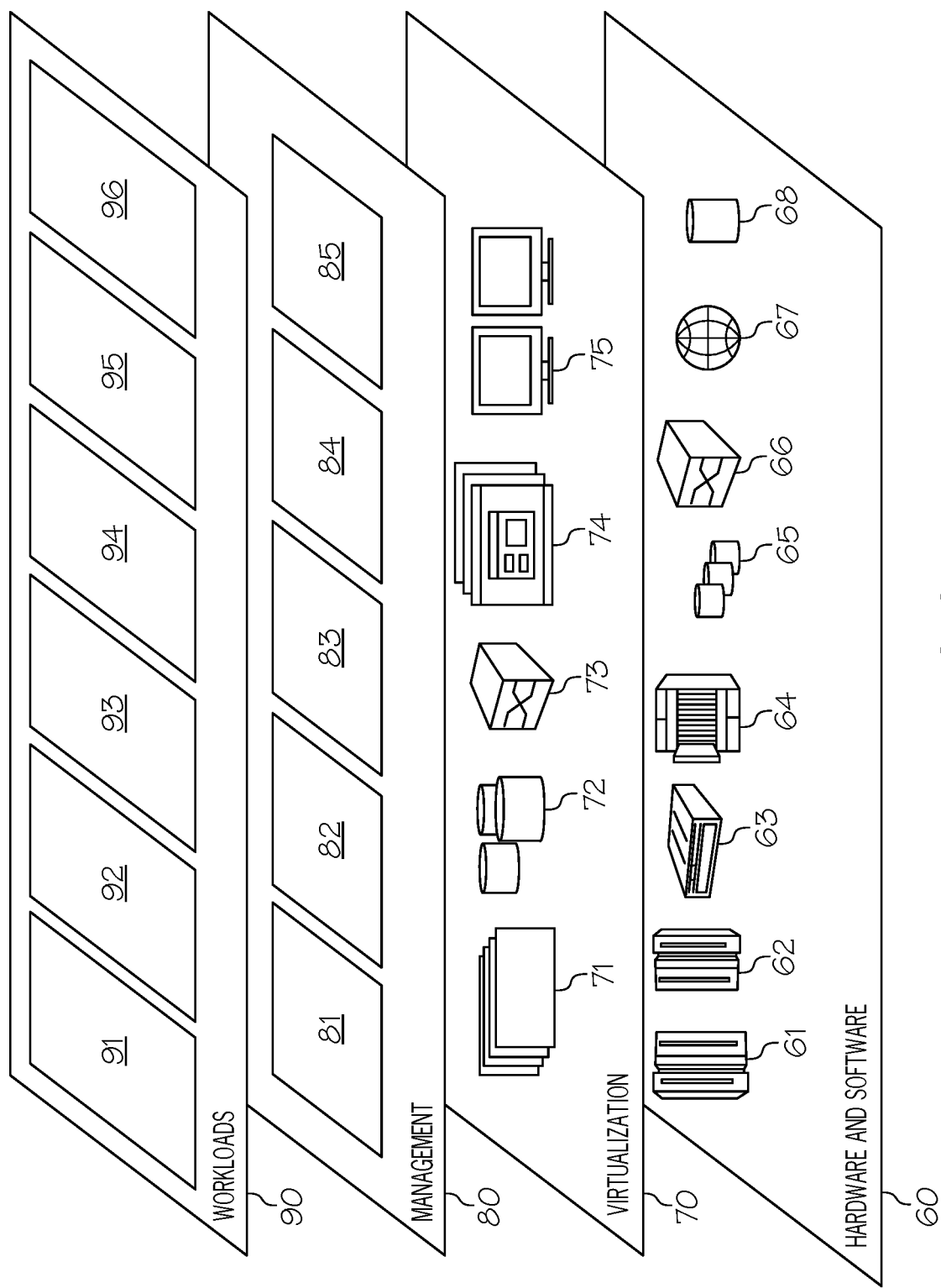
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and complex answer generation and utilization processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
receiving, by a deep question answering (DeepQA) system, a training set containing Question-Answer (QA) pairs having known unit-of-measurement terms, wherein each QA pair contains an answer having a known numeric value;
submitting a question from each QA pair from the training set to the DeepQA system in order to find answers and passage phrases to the question from each QA pair;
identifying, by the DeepQA system, all found answers and passage phrases having values that are within a predetermined range of answer values of the training set, wherein one or more of the identified all found answers and passage phrases contain unfamiliar unit-of-measurement terms, wherein unit-of-measurement terms describe concepts associated with the answer values, wherein the unfamiliar unit-of-measurement terms are unknown measurement terms that are unknown to the DeepQA system, and wherein the unknown measurement terms are not found in an answer key used by the DeepQA system;
defining, by the DeepQA system, the identified all found answers and passage phrases as hypothetical unit answers for answering a particular type of question;
for each hypothetical unit answer, inferring, by the DeepQA system, a hypothetical numeric translation value based on the known numeric value from the answer in the training set;
comparing, by the DeepQA system, the hypothetical numeric translation value for each hypothetical unit answer to numeric values from hypothetical numeric translation values that are applied to other answers and passage phrases from the identified all found answers and passage phrases;
evaluating, by the DeepQA system, how consistent the hypothetical numeric translation value is for each hypothetical unit answer from the identified all found answers and passage phrases;
utilizing, by the DeepQA system, how consistent the hypothetical numeric translation value is for each hypothetical unit answer to compute an overall translation value for the identified all found answers and passage phrases;
utilizing the answer key to train the DeepQA system to search for passages that answer the particular type of question, wherein the trained DeepQA system outputs an answer key value and an answer key measurement unit that is associated with the answer key value;
identifying a candidate answer that includes a candidate passage containing the answer key value but not the answer key measurement unit, wherein a candidate passage measurement unit in the candidate passage is associated with the answer key value;
matching the answer key measurement unit to the candidate passage measurement unit based on the answer key measurement unit and the candidate passage measurement unit both being associated with the answer key value;
retraining the trained DeepQA system to retrieve answers, for the particular type of question, that include one or more of the answer key measurement unit and the candidate passage measurement unit, wherein the retrained DeepQA system controls a physical aircraft;
receiving, by the retrained DeepQA system, the particular type of question;
retrieving, by the retrained DeepQA system, a passage that includes the answer key value and one or more of the answer key measurement unit and the candidate passage measurement unit;
answering, by the retrained DeepQA system, the particular type of question with the passage that includes the answer key value and one or more of the answer key measurement unit and the candidate passage measurement unit;
recognizing, by the retrained DeepQA system, that the physical aircraft is flying below an identified minimum approach speed while landing, wherein the minimum approach speed is identified by the retrained DeepQA system, and wherein an auto-assist hydraulic system is required to control a rudder of the physical aircraft if the physical aircraft is flying below the identified minimum approach speed while landing; and
in response to recognizing that the physical aircraft is flying below the identified minimum approach speed while landing, automatically activating, by the retrained DeepQA system, the auto-assist hydraulic system to control a rudder of the physical aircraft while the physical aircraft is landing.

2. The method of claim 1, further comprising:
utilizing, by the DeepQA system, the overall translation value to update an answer key with newly discovered appropriate answers and passage phrases.

3. The method of claim 2, wherein an answer key value in the answer key and an answer value in one or more of the identified all found answers and passage phrases that contain the unfamiliar unit-of-measurement terms are exact matches.

4. The method of claim 2, wherein an answer key value in the answer key and an answer value in one or more of the identified all found answers and passage phrases that contain the unfamiliar unit-of-measurement terms are within a predefined range.

5. The method of claim 1, further comprising:
receiving a new question by a trained DeepQA system that has been trained to recognize the unfamiliar unit-of-measurement terms as being equivalent to the known unit-of-measurement terms;
analyzing the new question to determine a lexical answer type (LAT) for the new question;
generating answers, to the new question, from one or more of the identified all found answers and passage phrases that contain the unfamiliar unit-of-measurement terms; and
selecting an answer based on a matching to the LAT and the hypothetical numeric translation value.

6. The method of claim 1, wherein the concept described by the unit-of-measurement terms is speed, and wherein different unit-of-measurement terms use different scales to describe a same concept associated with the answer values.

7. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

receiving a training set containing Question-Answer (QA) pairs having known unit-of-measurement terms, wherein each QA pair contains an answer having a known numeric value;

receiving a question from each QA pair from the training set in order to find answers and passage phrases to the question from each QA pair;

identifying all found answers and passage phrases having values that are within a predetermined range of answer values of the training set, wherein one or more of the identified all found answers and passage phrases contain unfamiliar unit-of-measurement terms, wherein unit-of-measurement terms describe concepts associated with the answer values, wherein the unfamiliar unit-of-measurement terms are unknown measurement terms that are unknown to the DeepQA system, and wherein the unknown measurement terms are not found in an answer key used by the DeepQA system;

defining the identified all found answers and passage phrases as hypothetical unit answers for answering a particular type of question;

for each hypothetical unit answer, inferring a hypothetical numeric translation value based on the known numeric value from the answer in the training set;

comparing the hypothetical numeric translation value for each hypothetical unit answer to numeric values from other answers and passage phrases from the identified all answers and passage phrases;

evaluating how consistent the hypothetical numeric translation value is for each hypothetical unit answer from the identified all found answers and passage phrases; and utilizing how consistent the hypothetical numeric translation value is for each hypothetical unit answer to compute an overall translation value for the identified all found answers and passage phrases;

utilizing the answer key to train a deep question answering (DeepQA) system to search for passages that answer the particular type of question, wherein the DeepQA system outputs an answer key value and an answer key measurement unit that is associated with the answer key value;

identifying a candidate answer that includes a candidate passage containing the answer key value but not the answer key measurement unit, wherein a candidate passage measurement unit in the candidate passage is associated with the answer key value;

matching the answer key measurement unit to the candidate passage measurement unit based on the answer key measurement unit and the candidate passage measurement unit both being associated with the answer key value;

retraining the trained DeepQA system to retrieve answers, for the particular type of question, that include one or more of the answer key measurement unit and the candidate passage measurement unit, wherein the retrained DeepQA system controls a physical aircraft;

sending, to the retrained DeepQA system, the particular type of question;

retrieving, from the retrained DeepQA system, a passage that includes the answer key value and one or more of the answer key measurement unit and the candidate passage measurement unit; and receiving, from the retrained DeepQA system, an answer to the particular type of question with the passage that includes the answer key value and one or more of the answer key measurement unit and the candidate passage measurement unit;

recognizing, by the retrained DeepQA system, that the physical aircraft is flying below an identified minimum approach speed while landing, wherein the minimum approach speed is identified by the retrained DeepQA system, and wherein an auto-assist hydraulic system is required to control a rudder of the physical aircraft if the physical aircraft is flying below the identified minimum approach speed while landing; and in response to recognizing that the physical aircraft is flying below the identified minimum approach speed while landing, automatically activating, by the retrained DeepQA system, the auto-assist hydraulic system to control a control surface of the physical aircraft while the physical aircraft is landing.

8. The computer system of claim 7, wherein the method further comprises:

utilizing the overall translation value to update an answer key with newly discovered appropriate answers and passage phrases.

9. The computer system of claim 8, wherein an answer key value in the answer key and an answer value in one or more of the identified all found answers and passage phrases that contain the unfamiliar unit-of-measurement terms are exact matches.

10. The computer system of claim 8, wherein an answer key value in the answer key and an answer value in one or more of the identified all found answers and passage phrases that contain the unfamiliar unit-of-measurement terms are within a predefined range.

11. The computer system of claim 7, wherein the method further comprises:

receiving a new question;

analyzing the new question to determine a lexical answer type (LAT) for the new question;

generating answers, to the new question, from one or more of the identified all found answers and passage phrases that contain the unfamiliar unit-of-measurement terms; and selecting an answer based on a matching to the LAT and the hypothetical numeric translation value.

12. The computer system of claim 7, wherein the stored program instructions are provided as a service in a cloud environment.

\* \* \* \* \*